Aug. 18, 1931.  G. T. MOTT  1,819,754
SUSPENSION DEVICE
Filed Oct. 29, 1927  2 Sheets-Sheet 1
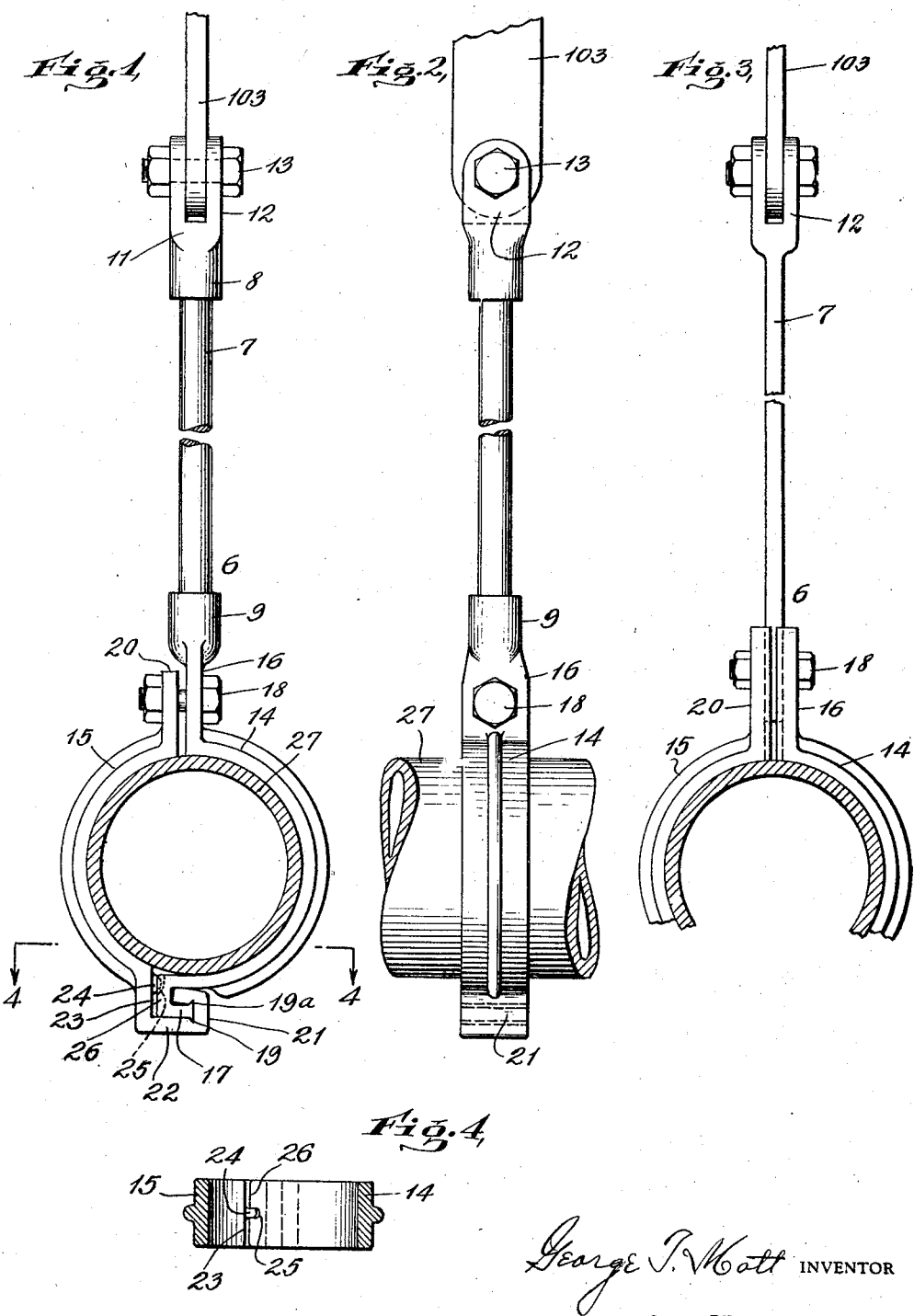

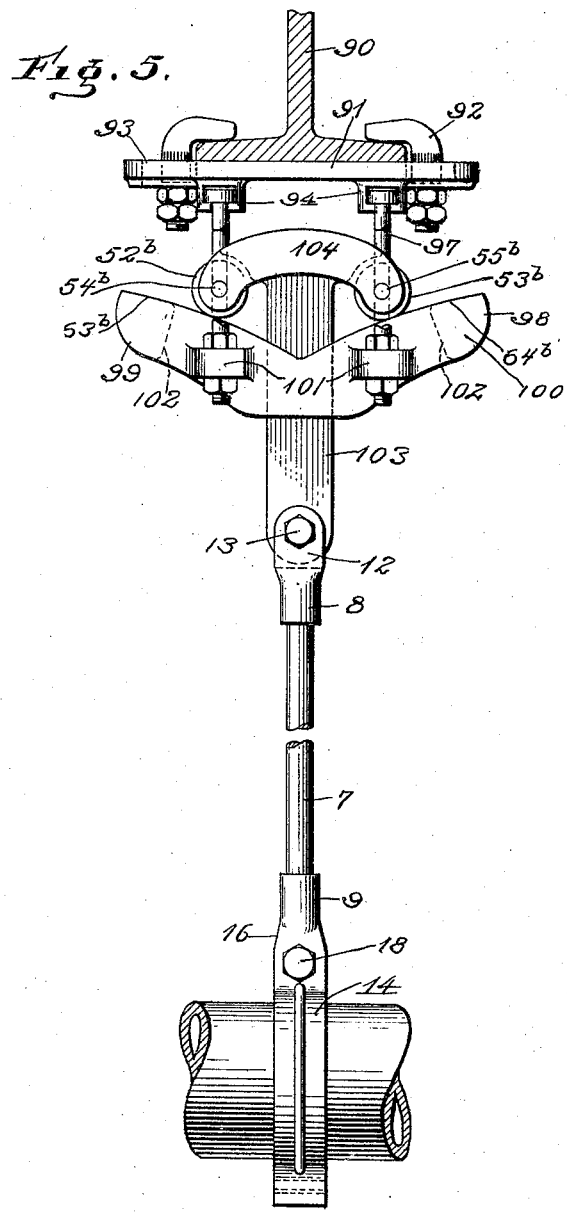

Patented Aug. 18, 1931

1,819,754

UNITED STATES PATENT OFFICE

GEORGE T. MOTT, OF PEARL RIVER, NEW YORK

SUSPENSION DEVICE

Application filed October 29, 1927. Serial No. 229,548.

The invention relates generally to suspension devices and is more particularly directed to suspension devices for movable load service, such as the suspension of pipe lines, bridges, beams, cables or other elements requiring support in perfect alinement and thru a given action.

In a common form of suspension device for the service referred to the direct suspension element is swung at one end from a fixed point and attached at the other end to the supported element or load, so that when the given action above referred to or movement of the load occurs, the suspension member of the device describes an arc, thus shortening the distance between the horizontal planes of the fixed point and the supported element or load and thus shifting the supported element or load out of its original alinement.

This form of suspension device has very grave defects, among others, in that, due to said shifting of the supported element or load out of its original alinement, the load carried by the supported element is distorted and injured. For example, a steam pipe so carried will be subjected to severe stress and the integrity of the joints thereby impaired with consequent leakage; and, further, by reason of the continuous alternate direction drag on the immediate pipe ring supports, the insulation is frequently injured or destroyed.

With the foregoing and other defects in view the invention has for an object to provide a form of suspension device especially adapted for movable load service and in which the action of the load, as expansion, is transmitted thru a rigid element from the end of said element, where the load is supported or carried, to the point of suspension of said element, where said action will be demonstrated in parallel relation to the action or movement of the load. By reason of this transmission of the action in parallelism or maintaining a fixed relative position between the saddle of the device, which supports the rigid element, and the opposite end of the said rigid element or load, the original alinement of the load is maintained, and the integrity of the mechanical structure, as the joints of a steam pipe and the insulation thereof, is permanently maintained. And in the case of a steam pipe fitted with expansive joints, the original alinement being thus preserved thruout, there is no tendency thru any extended length of pipe for the expansive joints to shift out of the horizontal and thus cause the gland and sleeve of any joint or joints to become bound on one side and destroy both the expansive joints and the packing, and, moreover, by reason of this perfect alinement, the number of expansive joints on a long run may be reduced.

Another object of the invention is to provide a suspension device of said character which will be simple and economical in construction and yet of substantial character and highly efficient and possessing ease and smoothness of operation, permitting any reasonable degree of expansion, or other action, in the supported load, and which device will be adjustable in nature so that a minute adjustment will be possible between any two or more supports. This ease and smoothness of operation in parallelism will, for example, obviate the destructive chattering so evident in power distributing piping or other lines subject to spasmodic impulse. These and other objects of the invention will be more fully set forth in the following description.

The invention consists in the novel parts, combinations, and features of construction herein shown and described.

In the accompanying drawings, which are referred to herein and form part thereof, is illustrated a preferred embodiment of the invention.

Of the drawings:

Fig. 1 is a front view, partly in section, parts being broken away, of a suspension device made in accordance with the principles of the invention;

Fig. 2 is a side view of the same, parts being broken away;

Fig. 3 is a front view, partly in section, of a modification, parts being broken away;

Fig. 4 is a plan view, taken on the lines 4—4 of Fig. 1, of a detail; and

Fig. 5 is a view similar to Fig. 2 but showing also the lever member thereof in detail with its mounting.

Referring in detail to the drawings, and first to Figs. 1, 2, 4 and 5, there is shown therein a preferred embodiment of the invention, the same including a rigid depending element 6, comprising a bar 7 inserted into upper and lower sockets 8 and 9, respectively. The upper socket 8 is yoke-shaped and a swinging supporting member or lever 103 extends between the arms 11 and 12, of the yoke, a pivotal mounting of the member 6 between the yoke and the lever being furnished by the bolt 13 which extends thru suitable orifices in the yoke and lever. Further reference will presently be made to this swinging supporting member or lever 103 and the pivotal mounting of the element 6 thereon.

The device is arranged to carry a load at the lower end of the element 6 and, while the arrangement may be carried into effect in various ways, there is provided a load-carrying member suitable for carrying a pipe and comprising ring sections 14, 15, the section 14 having a vertical extension 16 terminating in and being formed integral with the said lower socket 9.

At is lower end the section 14 extends beyond the centre of gravity of the rigid element 6 and the supported load so that the pipe may be supported in said section 14 while the section 15 is being fastened into place, as will be immediately described. According to one feature of the invention, also, the section 14 at its lower end is formed with a projection or turned back arm 17, see Fig. 1. The section 15, which is independent, has at its upper end a vertical extension 20 and in use is fastened to the section 14 at the upper end by a bolt 18, extending thru the said vertical extensions 16 and 20 of the respective section 14 and 15. As also fully shown in said Fig. 1, the section 15 at its lower end is formed with a projecting arm 22 which is turned back over the arm 17, so that said arms 22 and 17 mutually grip each other and form locking means to hold said ends against separation under normal load stresses. If the construction, as thus far described, be subjected to excess load or stresses, the turned back projections or ends will tend to sag and slip apart. According to one feature of the invention, therefore, additional locking means are provided to prevent such sagging and slipping apart under excess load or stresses, such means comprising a keyed element so arranged and located as to prevent relative movement of said turned back ends or arms 22 and 17 in the direction of their length, while at the same time permitting their disengagement laterally.

As shown, the arm 17 is provided at its upper end with a local extension or key 19$^a$, and the end of the arm 22 overlying and gripping the arm 17 is formed with a corresponding recess or keyway in its under face in which keyway the key 19$^a$ fits snugly. Preferably, also, the arm 17 is formed at its lower end with a depending additional local extension or key 19, see Fig. 1, and the arm 22 is formed in its upper face with a corresponding recess or keyway into which said key 19 fits snugly. It will be seen that with a keyed element arranged and located as thus described slippage of the arms 22 and 17 or movement in the direction of their length cannot take place. On its first turn or face 23 the section 15 has, immediately adjacent the point of turning a boss 24 which fits into a correspondingly shaped recess 25 in the oppositely disposed first turn or face 26 of the ring section 14, as fully shown in Figs. 1 and 4. In practice the load, as the pipe 27, is placed in the larger section 14 and the section 15 is then rigidly fastened to the section 14 by means of the bolt 18 at the top and at the bottom by the mutually engaging turned back arms heretofore described. It should be noted as an important advantage of the keylocking parts, just described, that the heavier the load or stress imposed upon the ring section 14, the closer will be the locking engagement between the local extensions or keys 19, 19$^a$ and the recessed adjacent contacting faces. A similar effect is obtained with the boss 24 and the recess 25 with the additional advantage that the boss and recess prevent any tendency toward side slipping of the sections 14 and 15. It may here be noted that these ring sections need not be circular in form but may be otherwise suitably formed. Furthermore, in lieu of the ring, the load carrying member at the lower end of the rigid element 6 may be of a character to meet any particular requirement or conditions of use.

It will be noted also that the rigid element 6, as shown in Fig. 1, at its ends is inserted, as stated, into the sockets 8 and 9, thus permitting the rigid element 6 to be varied in length by using rods 7 of various lengths. In the modification shown in Fig. 3, however, the ring sections are bolted directly to the rod 7 at any desired point within the limits of the extensions 16, 20 of said ring section, thus further increasing the adjustability of the device. And it will be also seen that any suitable form of load-carrying member may thus be bolted to said rod or the load or load carrying member may be secured to the rod in any desired manner. In this modification, also, the rod 7 at its upper end is formed into a yoke 12 without the intervention of a socket as in the embodiment shown in Fig. 1.

It is to be observed that the load carried by the device, according to its nature, may have a movement peculiar to itself, as in a horizontal plane. For example, the steam pipe illustrated will have a movement of expansion. And any variation of or interference with this movement by the suspension device will entail evils peculiar to the construction or load, as the rupture of the joints or insulation of the steam pipe. In order to avoid the evils incident to such interference with or variation of movement by the suspension device, the lever 103 and the mounting of the rigid member 6 thereon should be of such nature that the upper end of said rigid element 6 will move in a direction parallel to the path of travel of the load or the lower end of said element. To this end, therefore, said lever 103, must be mounted in such manner, that its lower end will travel in a horizontal plane. In my co-pending prior application, Serial No. 71,292, filed November 25, 1925, to which reference is hereby made, is shown one form of such a lever and one method of mounting the same. As there shown and as shown in Fig. 5 herein, an I-beam 90 or other support on the structural beam in any construction may be used, and a plate 91 is clamped thereto by clamping screws 92, passing through slots 93 which are extended longitudinally to permit adjustment to varying sizes of I-beams, as shown in said Fig. 5. Depending from the under side of the plate 91 and formed integrally therewith are annular lugs 94, one at each of the four corners of said plate, which are interiorly and laterally recessed to receive the heads 96 of four bolts 97, the lateral recesses in the lugs on one side of the plate extending in a direction opposite to that taken by the lateral recesses in the lugs on the opposite side, thus preventing any possibility of the bolts 97 slipping from their positions. At their lower ends said bolts 97 are fastened to a supporting eccentric member 98, having wings 99, 100 by means of bored lugs 101, two of said lugs being on each side of said member 98 and, as shown, on the wing portion thereof. Said eccentric member is formed with a recess 102 extending throughout the greater portion of its length, see the dotted lines in Fig. 5, in which recess is arranged normally in vertical position said lever 103 which has at its upper end a transverse arm 104 terminating in bifurcated ends in which are arranged rollers $52^b$, $53^b$ by means of pins $54^b$ and $55^b$. By so mounting the lever 104 with a rolling contact upon the operative faces $63^b$ and $64^b$, respectively, with their convex curves, of the wings 99 and 100 of the eccentric member 98, the lower end of said lever 103 is enabled to move in a true horizontal plane. For, as the lower end of said lever 103 moves to the right, say, the load on the left end of the lever 103 and roller $52^b$ will be instantly increased, with a compensating diminution of the load on the opposite end of said lever 103 and roller $53^b$. The roller $52^b$ will descend but in a gradual manner due to the nature of the curve of the face $63^b$, the descent being further safe-guarded and checked because of the ascent on the curved face $64^b$ of the right end of the lever 103 and the roller $53^b$. Because of the equality of the curves $63^b$ and $64^b$, the ascent of the roller $53^b$ will correspond exactly to the descent of the roller $52^b$. As the positive action subsides, it will be seen that there will be a movement of the lever 103 in the reverse direction. It will be seen that, as the rigid element 6 is pivotally mounted by means of the bolt 13 in said lever 103, the upper end of said member 6 will follow a path of travel parallel to the line of motion of the load, as the pipe 27.

It will be seen that a suspension device constructed in accordance with the foregoing description will carry out the objects of the invention as above set forth and will possess other advantages which will be apparent to those skilled in the art.

The invention in its broader aspects is not limited to the precise construction shown and described, as many changes may be made in the details thereof without departing from the main principles of the invention or sacrificing its chief advantages.

I claim:

1. For a suspension device, a load-carrying member adapted to hold in rigid engagement therewith a supported element, said load-carrying member having at opposite ends projections arranged in mutual gripping relation and forming locking means to hold said ends against separation under normal load stresses; and an additional locking element to hold said ends against separation under excess load stresses, said additional locking element including a local key extension on one of said ends while an adjacent portion of the other of said ends is formed with a corresponding recess therein to provide a keyway for said key extension.

2. For a suspension device, a load-carrying member including sections having turned back ends arranged in interlocking engagement to hold said ends against separation under normal load stresses; and additional locking means to hold said ends against separation under excess load stresses, said additional locking means being arranged to prevent relative movement of said ends in the direction of their length, while permitting lateral disengagement thereof.

3. For a suspension device, a load-carrying member including sections having turned back ends arranged in interlocking engagement to hold said ends against separation under normal load stresses; and additional locking means to hold said ends against separation under excess load stresses, said additional locking means including a local key extension on one of said ends while the other of said ends is formed with a corresponding recess therein to provide a keyway for said key extension, said key extension and recess being located and arranged to prevent relative movement of said turned back ends in the direction of their length while permitting lateral disengagement thereof.

4. For a suspension device, a load-carrying member including sections having turned back ends arranged in interlocking engagement to hold said ends against separation under normal load stresses; and additional locking means to hold said ends against separation under excess load stresses, said additional locking means including a plurality of local key extensions on one of said ends while the other of said ends is formed with a plurality of corresponding recesses therein to provide keyways for said key extensions, said key extensions and recesses being located and arranged to prevent relative movement of said turned back ends in the direction of their length, while permitting lateral disengagement thereof.

5. For a suspension device, a load-carrying member including sections having turned back ends arranged in interlocking engagement to hold said ends against separation under normal load stresses; and additional locking means to hold said ends against separation under excess load stresses, said additional locking means including a plurality of local key extensions on one of said ends while the other of said ends is formed with a plurality of corresponding recesses therein to provide keyways for said key extensions, said key extensions and recesses being located and arranged to prevent relative movement of said turned back ends in the direction of their length, while permitting lateral disengagement thereof, and one of said sections being formed with another recess therein and the other of said sections having a projecting boss adapted to fit in said recess.

6. For a supporting device, a load-carrying member comprising oppositely disposed sections terminating in turned back arms to form loops, each turned back arm being enclosed within the loop of the other section, one of said sections having on its turn a projecting boss, and the other said section being formed with a recess in its turn to receive said boss.

7. For a supporting device, a load-carrying member comprising oppositely disposed sections terminating in turned back arms to form loops, each turned back arm being enclosed within the loop of the other section, and said arms being formed with a keyway and a key enveloped therein, one of said sections having on its turn a projecting boss, and the other said section being formed with a recess in its turn to receive said boss.

In testimony whereof, I have affixed my signature hereto.

GEORGE T. MOTT.